(12) United States Patent
Gollogly

(10) Patent No.: US 10,922,425 B2
(45) Date of Patent: Feb. 16, 2021

(54) ESTABLISHMENT OF A CONFIDENTIAL BLOCKCHAIN NETWORK

(71) Applicant: Microsoft Technology Licensing, LLC, Redmond, WA (US)

(72) Inventor: Jonathan James Gollogly, Boonsboro, MD (US)

(73) Assignee: Microsoft Technology Licensing, LLC, Redmond, WA (US)

(*) Notice: Subject to any disclaimer, the term of this patent is extended or adjusted under 35 U.S.C. 154(b) by 217 days.

(21) Appl. No.: 15/945,712

(22) Filed: Apr. 4, 2018

(65) Prior Publication Data

US 2019/0311147 A1    Oct. 10, 2019

(51) Int. Cl.
| | |
|---|---|
| *G06F 21/62* | (2013.01) |
| *H04L 9/06* | (2006.01) |
| *H04L 29/06* | (2006.01) |
| *G06F 21/64* | (2013.01) |
| *G06F 21/60* | (2013.01) |
| *G06F 16/27* | (2019.01) |

(52) U.S. Cl.
CPC .......... *G06F 21/6218* (2013.01); *G06F 16/27* (2019.01); *G06F 21/604* (2013.01); *G06F 21/645* (2013.01); *H04L 9/0637* (2013.01); *H04L 63/102* (2013.01)

(58) Field of Classification Search
CPC .. G06F 21/6218; G06F 21/604; G06F 21/645; G06F 16/27; H04L 63/102; H04L 9/0637
See application file for complete search history.

(56) References Cited

U.S. PATENT DOCUMENTS

| | | |
|---|---|---|
| 2006/0190411 A1 | 8/2006 | Gava et al. |
| 2010/0229246 A1 | 9/2010 | Warrington et al. |
| 2012/0011361 A1 | 1/2012 | Guerrero et al. |

(Continued)

OTHER PUBLICATIONS

Gollogly, Jonathan James; "Proof of Ticket Consensus Processing on a Confidential Blockchain Network"; U.S. Appl. No. 15/945,724, filed Apr. 4, 2018; 33 pages.

(Continued)

*Primary Examiner* — Ashokkumar B Patel
*Assistant Examiner* — William B Jones
(74) *Attorney, Agent, or Firm* — Davin Chin; Chin IP, PLLC

(57) ABSTRACT

A permissioned blockchain is caused to be deployed to nodes. Access level blocks are established. Each access level block is configured to store a nanoblock. Each nanoblock is an encrypted database. The access level blocks include access levels blocks for users, and the corresponding access level block for each user includes security credentials for the user. For each access level block: nodes are selected for deployment of the access level block; and the access level block is replicated to each of the selected nodes, such that, after replicating the access level blocks, there are at least two copies of each access level block on the permissioned blockchain, and the permissioned blockchain is capable of performing cryptographic operations, including determining permissions of the users based on the security credentials for the users, and is further capable of storing details of the cryptographic operations on the nanoblocks.

20 Claims, 5 Drawing Sheets

(56) References Cited

U.S. PATENT DOCUMENTS

| | | |
|---|---|---|
| 2017/0243213 A1 | 8/2017 | Castinado et al. |
| 2018/0060496 A1* | 3/2018 | Bulleit et al. |
| 2018/0096175 A1* | 4/2018 | Schmeling ............. G06Q 10/08 |
| 2018/0115426 A1* | 4/2018 | Andrade ............... H04L 9/3236 |
| 2018/0225660 A1* | 8/2018 | Chapman ........... G06Q 20/3827 |
| 2019/0349426 A1* | 11/2019 | Smith .................. H04L 67/104 |

OTHER PUBLICATIONS

Lemahieu, Colin, "RaiBlocks: A Feeless Distributed Cryptocurrency Network", Retrieved from: https://raiblocks.net/media/RaiBlocks_Whitepaper_English.pdf, Jan. 1, 2018, 8 Pages.

"International Search Report and Written Opinion Issued in PCT Application No. PCT/US2019/030503", dated Jun. 13, 2019, 12 Pages.

"Non Provisional Application Filed as U.S. Appl. No. 15/975,945", Mailed Date: May 10, 2018, 35 Pages.

"Non Final Office Action Issued in U.S. Appl. No. 15/975,945", dated May 14, 2020, 8 Pages.

"Final Office Action Issued in U.S. Appl. No. 15/975,945", dated Oct. 29, 2020, 8 Pages.

* cited by examiner

ESTABLISHMENT OF A CONFIDENTIAL BLOCKCHAIN NETWORK

BACKGROUND

Classified information is material that a government body deems to be sensitive information that must be protected. Access is restricted by law or regulation to particular groups of people with the necessary security clearance and need to know, and mishandling of the material can incur criminal penalties. A formal security clearance is required to view or handle classified documents or to access classified data. The clearance process requires a satisfactory background investigation. Documents and other information are marked with one of several (hierarchical) levels of sensitivity—e.g., restricted, confidential, secret and top secret. The choice of level is based on an impact assessment; governments have their own criteria, which include how to determine the classification of an information asset, and rules on how to protect information classified at each level. This often includes security clearances for personnel handling the information. Classifications can be used with additional keywords that give more detailed instructions on how data should be used or protected. For example, a particular secret or top-secret project may be given a codeword, and an individual may, for example, have clearance for a top-secret project with a particular codeword, but not have clearance for other top-secret information.

Some corporations and non-government organizations may also assign sensitive information to multiple levels of protection, either from a desire to protect trade secrets, or because of laws and regulations governing various matters such as personal privacy, sealed legal proceedings, and the timing of financial information releases.

The U.S. classification system is currently established under Executive Order 13526 and has three levels of classification—Confidential, Secret, and Top Secret. A variety of markings are used for material that is not classified, but whose distribution is limited administratively or by other laws, e.g., For Official Use Only (FOUO), or Sensitive but Unclassified (SBU). The requirements, including marking requirements, associated with information classified by the United States federal government is currently governed by the director of Central Intelligence Agency (CIA) directive, the Department of Defense (DOD) joint Air Force Army Navy manual confidentiality requirements, the intelligence community (IC) directive 503 (icd 503) risk management framework, and the current directives of the DOD special access project (SAP) and IC SAP communities.

There are platforms and products that exist for implementing security classification marking or file access validation for classified information. Typically, the access and marking validation attributes and requirements are stored in a central database. Typically, the application servers used in a classified setting require installation of an agent that intercepts and interrupts the delivery of the data customer marking and validation requirements. Typically, the agent has a connection to a single database for validation, and text-based marking and text-based validation are used.

SUMMARY OF THE DISCLOSURE

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Briefly stated, the disclosed technology is generally directed to security technology. In one example of the technology, a permissioned blockchain is caused to be deployed to a plurality of nodes. In some examples, a plurality of access level blocks is established. In some examples, each access level block is configured to store a plurality of nanoblocks, and each nanoblock is an encrypted database. In some examples, the access level blocks include access levels blocks for users, and the corresponding access level block for each user includes security credentials for the user. In some examples, for each access level block of the plurality of access level blocks: nodes are selected among the plurality of nodes for deployment of the access level block; and the access level block is replicated to each of the selected nodes, such that, after replicating the access level blocks, there are at least two copies of each access level block on the permissioned blockchain, and the permissioned blockchain is capable of performing cryptographic operations, including determining permissions of the users based at least in part on the security credentials for the users, and is further capable of storing details of the cryptographic operations on the nanoblocks of the access level blocks.

Other aspects of and applications for the disclosed technology will be appreciated upon reading and understanding the attached figures and description.

BRIEF DESCRIPTION OF THE DRAWINGS

Non-limiting and non-exhaustive examples of the present disclosure are described with reference to the following drawings. In the drawings, like reference numerals refer to like parts throughout the various figures unless otherwise specified. These drawings are not necessarily drawn to scale.

For a better understanding of the present disclosure, reference will be made to the following Detailed Description, which is to be read in association with the accompanying drawings, in which.

DETAILED DESCRIPTION

Figure 1:
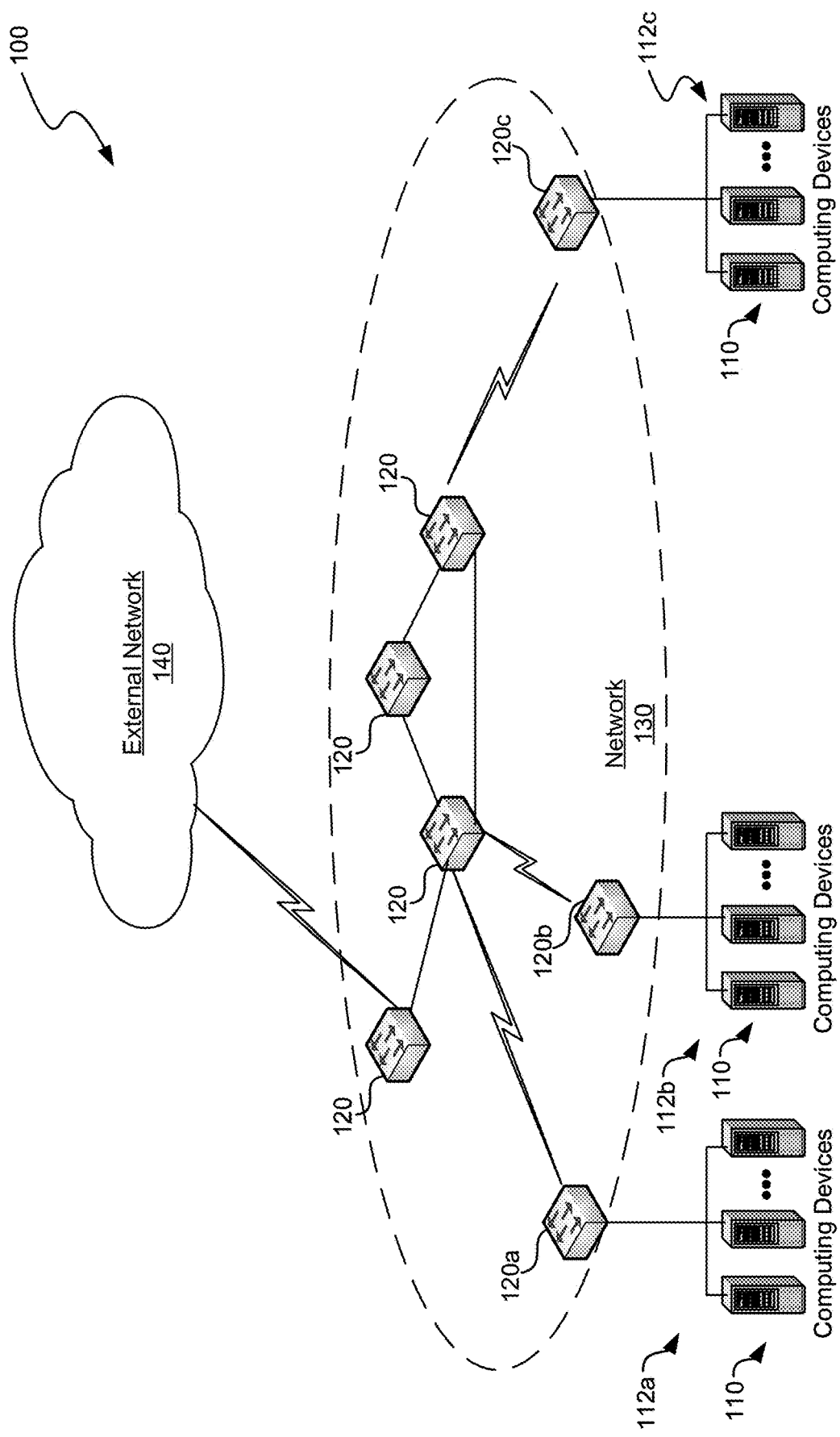
FIG. 1 is a block diagram illustrating one example of a suitable environment in which aspects of the technology may be employed.

The following description provides specific details for a thorough understanding of, and enabling description for, various examples of the technology. One skilled in the art will understand that the technology may be practiced without many of these details. In some instances, well-known structures and functions have not been shown or described in detail to avoid unnecessarily obscuring the description of examples of the technology. It is intended that the terminology used in this disclosure be interpreted in its broadest reasonable manner, even though it is being used in conjunction with a detailed description of certain examples of the technology. Although certain terms may be emphasized below, any terminology intended to be interpreted in any restricted manner will be overtly and specifically defined as such in this Detailed Description section. Throughout the specification and claims, the following terms take at least the meanings explicitly associated herein, unless the context dictates otherwise. The meanings identified below do not necessarily limit the terms, but merely provide illustrative examples for the terms. For example, each of the terms "based on" and "based upon" is not exclusive, and is equivalent to the term "based, at least in part, on", and includes the option of being based on additional factors, some of which may not be described herein. As another example, the term "via" is not exclusive, and is equivalent to the term "via, at least in part", and includes the option of being via additional factors, some of which may not be described herein. The meaning of "in" includes "in" and "on." The phrase "in one embodiment," or "in one example," as used herein does not necessarily refer to the same embodiment or example, although it may. Use of particular textual numeric designators does not imply the existence of lesser-valued numerical designators. For example, reciting "a widget selected from the group consisting of a third foo and a fourth bar" would not itself imply that there are at least three foo, nor that there are at least four bar, elements. References in the singular are made merely for clarity of reading and include plural references unless plural references are specifically excluded. The term "or" is an inclusive "or" operator unless specifically indicated otherwise. For example, the phrases "A or B" means "A, B, or A and B." As used herein, the terms "component" and "system" are intended to encompass hardware, software, or various combinations of hardware and software. Thus, for example, a system or component may be a process, a process executing on a computing device, the computing device, or a portion thereof.

Briefly stated, the disclosed technology is generally directed to security technology. In one example of the technology, a permissioned blockchain is caused to be deployed to a plurality of nodes. In some examples, a plurality of access level blocks is established. In some examples, each access level block is configured to store a plurality of nanoblocks, and each nanoblock is an encrypted database. In some examples, the access level blocks include access levels blocks for users, and the corresponding access level block for each user includes security credentials for the user. In some examples, for each access level block of the plurality of access level blocks: nodes are selected among the plurality of nodes for deployment of the access level block; and the access level block is replicated to each of the selected nodes, such that, after replicating the access level blocks, there are at least two copies of each access level block on the permissioned blockchain, and the permissioned blockchain is capable of performing cryptographic operations, including determining permissions of the users based at least in part on the security credentials for the users, and is further capable of storing details of the cryptographic operations on the nanoblocks of the access level blocks.

In some examples, a permissioned blockchain is established. In some examples, the permissioned blockchain, when established, is capable of performing cryptographic functions, such as verifying the security credentials of a user. For example, before a user views a classified document, the permissioned blockchain may be used to determine whether the user has the proper security credentials to view the classified document.

The permissioned blockchain may first be deployed to a number of nodes that will run the permissioned blockchain. Then, in some examples, access level blocks are defined for the permissioned blockchain. There may be an access level block for each user, an access level block for each defined clearance level, each defined group, each defined object, each defined physical location, each defined trigraph security marking, each defined SAP codeword, and each defined labeling or access control requirement.

In some examples, each access level block is configured to store nanoblocks, where each nanoblock is an encrypted database. In some examples, the access level blocks are then asynchronously and securely replicated out to the nodes. In some examples, at least N copies are kept of each access level block, where N is at least two. In a typical blockchain, every node has the same ledger. In some examples of permissioned blockchain 350, for security reasons, a certain degree of uniqueness of each node is maintained, such that each node does not store the exact same access level blocks as another node, to the extent possible and feasible. The amount of uniqueness required and the number of total nodes (i.e., the total cardinality of the nodes) available are both factors in some examples. For each access level block, an algorithm may be used to determined which nodes the access level block is to be replicated out to, and then the nodes are seeded with the access level blocks. Once the nodes are so seeded, in some examples, the permissioned blockchain is ready for normal operation.

Illustrative Devices/Operating Environments

FIG. 1 is a diagram of environment 100 in which aspects of the technology may be practiced. As shown, environment 100 includes computing devices 110, as well as network nodes 120, connected via network 130. Even though particular components of environment 100 are shown in FIG. 1, in other examples, environment 100 can also include additional and/or different components. For example, in certain examples, the environment 100 can also include network storage devices, maintenance managers, and/or other suitable components (not shown). Computing devices 110 shown in FIG. 1 may be in various locations, including on premise, in the cloud, or the like. For example, computer devices 110 may be on the client side, on the server side, or the like.

As shown in FIG. 1, network 130 can include one or more network nodes 120 that interconnect multiple computing devices 110, and connect computing devices 110 to external network 140, e.g., the Internet or an intranet. For example, network nodes 120 may include switches, routers, hubs, network controllers, or other network elements. In certain examples, computing devices 110 can be organized into racks, action zones, groups, sets, or other suitable divisions. For example, in the illustrated example, computing devices 110 are grouped into three host sets identified individually as first, second, and third host sets 112a-112c. In the illustrated example, each of host sets 112a-112c is operatively coupled to a corresponding network node 120a-120c, respectively, which are commonly referred to as "top-of-rack" or "TOR" network nodes. TOR network nodes 120a-120c can then be operatively coupled to additional network nodes 120 to form a computer network in a hierarchical, flat, mesh, or other suitable types of topology that allows communications between computing devices 110 and external network 140. In other examples, multiple host sets 112a-112c may share a single network node 120. Computing devices no may be virtually any type of general- or specific-purpose computing device. For example, these computing devices may be user devices such as desktop computers, laptop computers, tablet computers, display devices, cameras, printers, or smartphones. However, in a data center environment, these computing devices may be server devices such as application server computers, virtual computing host computers, or file server computers. Moreover, computing devices 110 may be individually configured to provide computing, storage, and/or other suitable computing services.

Illustrative Computing Device

Figure 2:
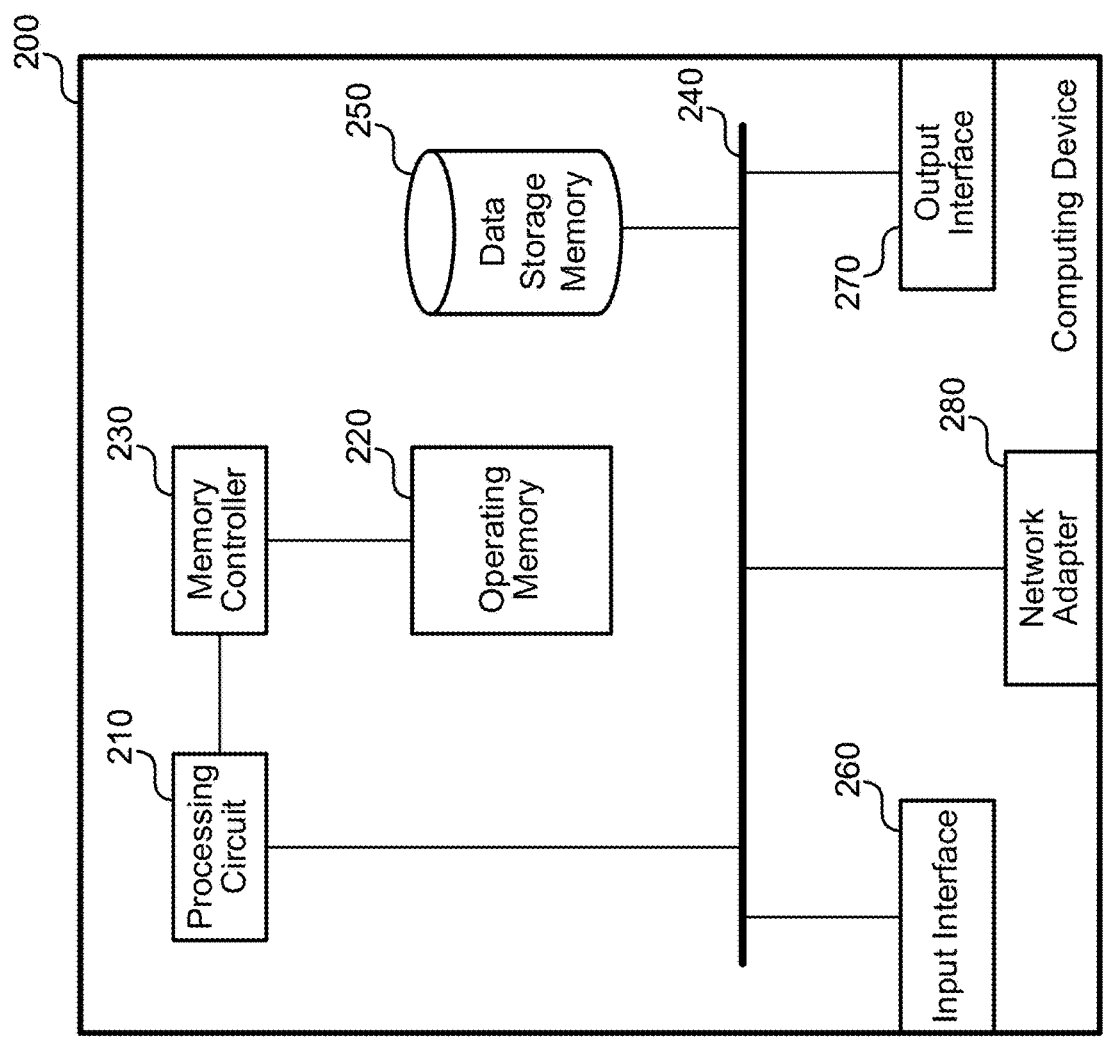
FIG. 2 is a block diagram illustrating one example of a suitable computing device according to aspects of the disclosed technology.

FIG. 2 is a diagram illustrating one example of computing device 200 in which aspects of the technology may be practiced. Computing device 200 may be virtually any type of general- or specific-purpose computing device. For example, computing device 200 may be a user device such as a desktop computer, a laptop computer, a tablet computer, a display device, a camera, a printer, embedded device, programmable logic controller (PLC), or a smartphone. Likewise, computing device 200 may also be server device such as an application server computer, a virtual computing host computer, or a file server computer, e.g., computing device 200 may be an example of computing device 110 or network node 120 of FIG. 1. Computing device 200 may also be an IoT device that connects to a network to receive IoT services. Likewise, computer device 200 may be an example any of the devices, nodes, members, or other entities illustrated in or referred to in various figures, as discussed in greater detail below. As illustrated in FIG. 2, computing device 200 includes processing circuit 210, operating memory 220, memory controller 230, data storage memory 250, input interface 260, output interface 270, and network adapter 280. Each of these afore-listed components of computing device 200 includes at least one hardware element.

Computing device 200 includes at least one processing circuit 210 configured to execute instructions, such as instructions for implementing the herein-described workloads, processes, or technology. Processing circuit 210 may include a microprocessor, a microcontroller, a graphics processor, a coprocessor, a field-programmable gate array, a programmable logic device, a signal processor, or any other circuit suitable for processing data. The aforementioned instructions, along with other data (e.g., datasets, metadata, operating system instructions, etc.), may be stored in operating memory 220 during run-time of computing device 200. Operating memory 220 may also include any of a variety of data storage devices/components, such as volatile memories, semi-volatile memories, random access memories, static memories, caches, buffers, or other media used to store run-time information. In one example, operating memory 220 does not retain information when computing device 200 is powered off. Rather, computing device 200 may be configured to transfer instructions from a non-volatile data storage component (e.g., data storage component 250) to operating memory 220 as part of a booting or other loading process.

Operating memory 220 may include 4th generation double data rate (DDR4) memory, 3rd generation double data rate (DDR3) memory, other dynamic random access memory (DRAM), High Bandwidth Memory (HBM), Hybrid Memory Cube memory, 3D-stacked memory, static random access memory (SRAM), or other memory, and such memory may comprise one or more memory circuits integrated onto a DIMM, SIMM, SODIMM, or other packaging. Such operating memory modules or devices may be organized according to channels, ranks, and banks. For example, operating memory devices may be coupled to processing circuit 210 via memory controller 230 in channels. One example of computing device 200 may include one or two DIMMs per channel, with one or two ranks per channel. Operating memory within a rank may operate with a shared clock, and shared address and command bus. Also, an operating memory device may be organized into several banks where a bank can be thought of as an array addressed by row and column. Based on such an organization of operating memory, physical addresses within the operating memory may be referred to by a tuple of channel, rank, bank, row, and column.

Despite the above-discussion, operating memory 220 specifically does not include or encompass communications media, any communications medium, or any signals per se.

Memory controller 230 is configured to interface processing circuit 210 to operating memory 220. For example, memory controller 230 may be configured to interface commands, addresses, and data between operating memory 220 and processing circuit 210. Memory controller 230 may also be configured to abstract or otherwise manage certain aspects of memory management from or for processing circuit 210. Although memory controller 230 is illustrated as single memory controller separate from processing circuit 210, in other examples, multiple memory controllers may be employed, memory controller(s) may be integrated with operating memory 220, or the like. Further, memory controller(s) may be integrated into processing circuit 210. These and other variations are possible.

In computing device 200, data storage memory 250, input interface 260, output interface 270, and network adapter 280 are interfaced to processing circuit 210 by bus 240. Although, FIG. 2 illustrates bus 240 as a single passive bus, other configurations, such as a collection of buses, a collection of point to point links, an input/output controller, a bridge, other interface circuitry, or any collection thereof may also be suitably employed for interfacing data storage memory 250, input interface 260, output interface 270, or network adapter 280 to processing circuit 210.

In computing device 200, data storage memory 250 is employed for long-term non-volatile data storage. Data storage memory 250 may include any of a variety of non-volatile data storage devices/components, such as non-volatile memories, disks, disk drives, hard drives, solid-state drives, or any other media that can be used for the non-volatile storage of information. However, data storage memory 250 specifically does not include or encompass communications media, any communications medium, or any signals per se. In contrast to operating memory 220, data storage memory 250 is employed by computing device 200 for non-volatile long-term data storage, instead of for run-time data storage.

Also, computing device 200 may include or be coupled to any type of processor-readable media such as processor-readable storage media (e.g., operating memory 220 and data storage memory 250) and communication media (e.g., communication signals and radio waves). While the term processor-readable storage media includes operating memory 220 and data storage memory 250, the term "processor-readable storage media," throughout the specification and the claims whether used in the singular or the plural, is defined herein so that the term "processor-readable storage media" specifically excludes and does not encompass communications media, any communications medium, or any signals per se. However, the term "processor-readable storage media" does encompass processor cache, Random Access Memory (RAM), register memory, and/or the like.

Computing device 200 also includes input interface 260, which may be configured to enable computing device 200 to receive input from users or from other devices. In addition, computing device 200 includes output interface 270, which may be configured to provide output from computing device 200. In one example, output interface 270 includes a frame buffer, graphics processor, graphics processor or accelerator, and is configured to render displays for presentation on a separate visual display device (such as a monitor, projector, virtual computing client computer, etc.). In another example, output interface 270 includes a visual display device and is configured to render and present displays for viewing.

In the illustrated example, computing device 200 is configured to communicate with other computing devices or entities via network adapter 280. Network adapter 280 may include a wired network adapter, e.g., an Ethernet adapter, a Token Ring adapter, or a Digital Subscriber Line (DSL) adapter. Network adapter 280 may also include a wireless network adapter, for example, a Wi-Fi adapter, a Bluetooth adapter, a ZigBee adapter, a Long Term Evolution (LTE) adapter, or a 5G adapter.

Although computing device 200 is illustrated with certain components configured in a particular arrangement, these components and arrangements are merely one example of a computing device in which the technology may be employed. In other examples, data storage memory 250, input interface 260, output interface 270, or network adapter 280 may be directly coupled to processing circuit 210, or be coupled to processing circuit 210 via an input/output controller, a bridge, or other interface circuitry. Other variations of the technology are possible.

Some examples of computing device 200 include at least one memory (e.g., operating memory 220) adapted to store run-time data and at least one processor (e.g., processing unit 210) that is respectively adapted to execute processor-executable code that, in response to execution, enables computing device 200 to perform actions.

Illustrative Systems

Figure 3:
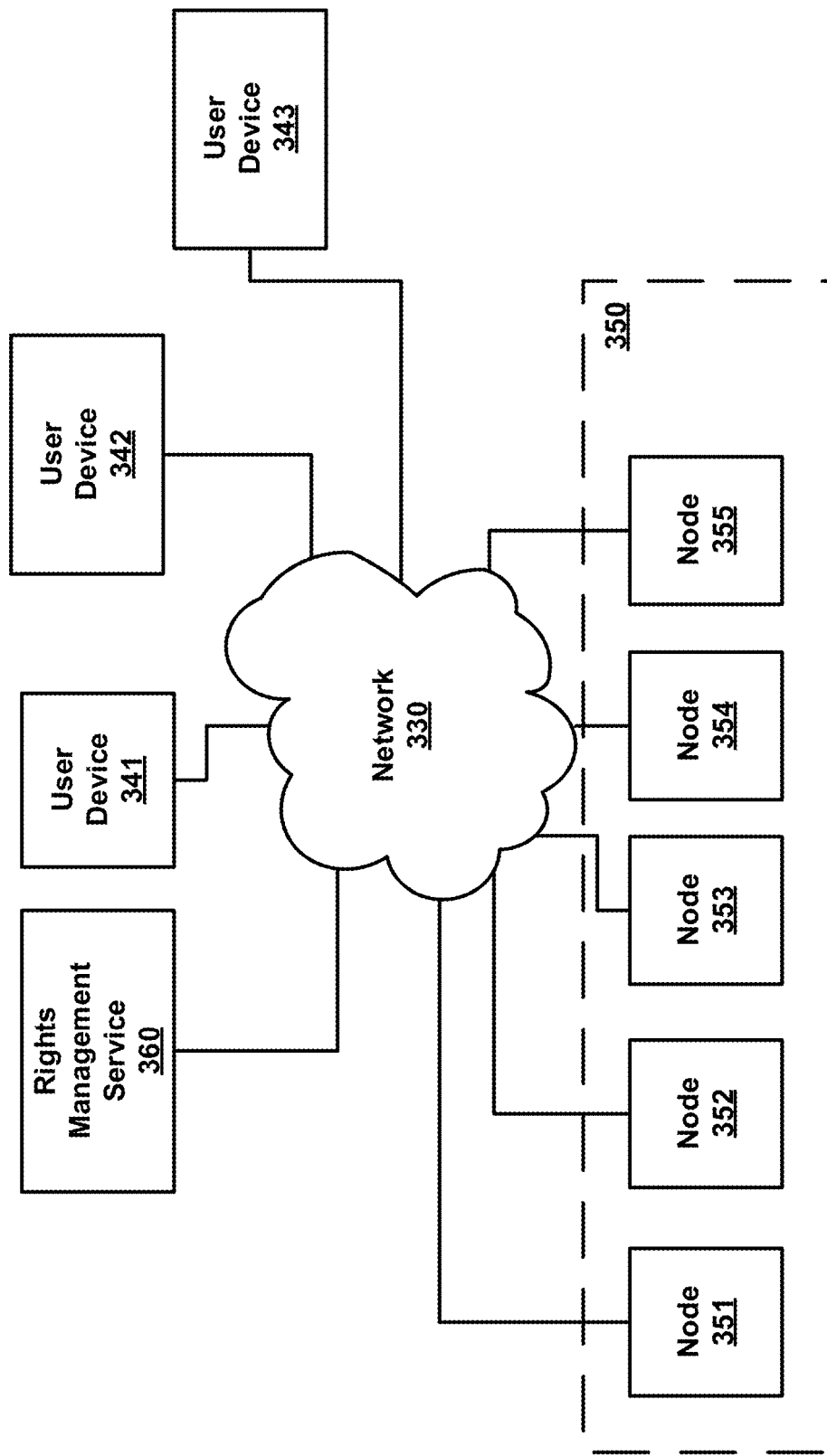
FIG. 3 is a block diagram illustrating an example of a system.

FIG. 3 is a block diagram illustrating an example of a system (300) for a confidential blockchain. System 300 may include network 330, as well as permissioned blockchain 350, rights management service 360, and user devices 341-343, which all may connect to network 330. Permissioned blockchain 350 may include nodes 351-355.

Each of the member devices nodes 351-355 and user devices 341-343 may include examples of computing device 200 of FIG. 2, and rights management service 460 may include one or more computing devices such as an example of computing device 200 of FIG. 2. FIG. 3 and the corresponding description of FIG. 3 in the specification illustrates an example system for illustrative purposes that does not limit the scope of the disclosure.

Network 330 may include one or more computer networks, including wired and/or wireless networks, where each network may be, for example, a wireless network, local area network (LAN), a wide-area network (WAN), and/or a global network such as the Internet. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. Network 330 may include various other networks such as one or more networks using local network protocols such as 6LoWPAN, ZigBee, or the like. Some IoT devices may be connected to a user device via a different network in network 330 than other IoT devices. In essence, network 330 includes any communication method by which information may travel between nodes 351-355, rights management service 360, and user devices 341-343. Although each device or service is shown connected as connected to network 330, that does not mean that each device communicates with each other device shown. In some examples, some devices/services shown only communicate with some other devices/services shown via one or more intermediary devices. Also, although network 330 is illustrated as one network, in some examples, network 330 may instead include multiple networks that may or may not be connected with each other, with some of the devices shown communicating with each other through one network of the multiple networks and other of the devices shown communicating with each other with a different network of the multiple networks.

Rights management service may be used to set up permissioned blockchain 350. In some examples, user devices 341-343 are devices which may need marking, validation, and/or data access functions associated with classified, confidential, and/or sensitive information. When such a function is necessary, the user device may communicate with permissioned blockchain 350 to determine, in real time, whether the user has the necessary corresponding permission. In some examples, nodes from among nodes 351-355 that have the corresponding access level block determine, via proof of ticket consensus, whether the user has the necessary corresponding permission. The "ticket" is the necessary security credentials to access the information.

System 300 may include more or less devices than illustrated in FIG. 3, which is shown by way of example only.

Figure 4:
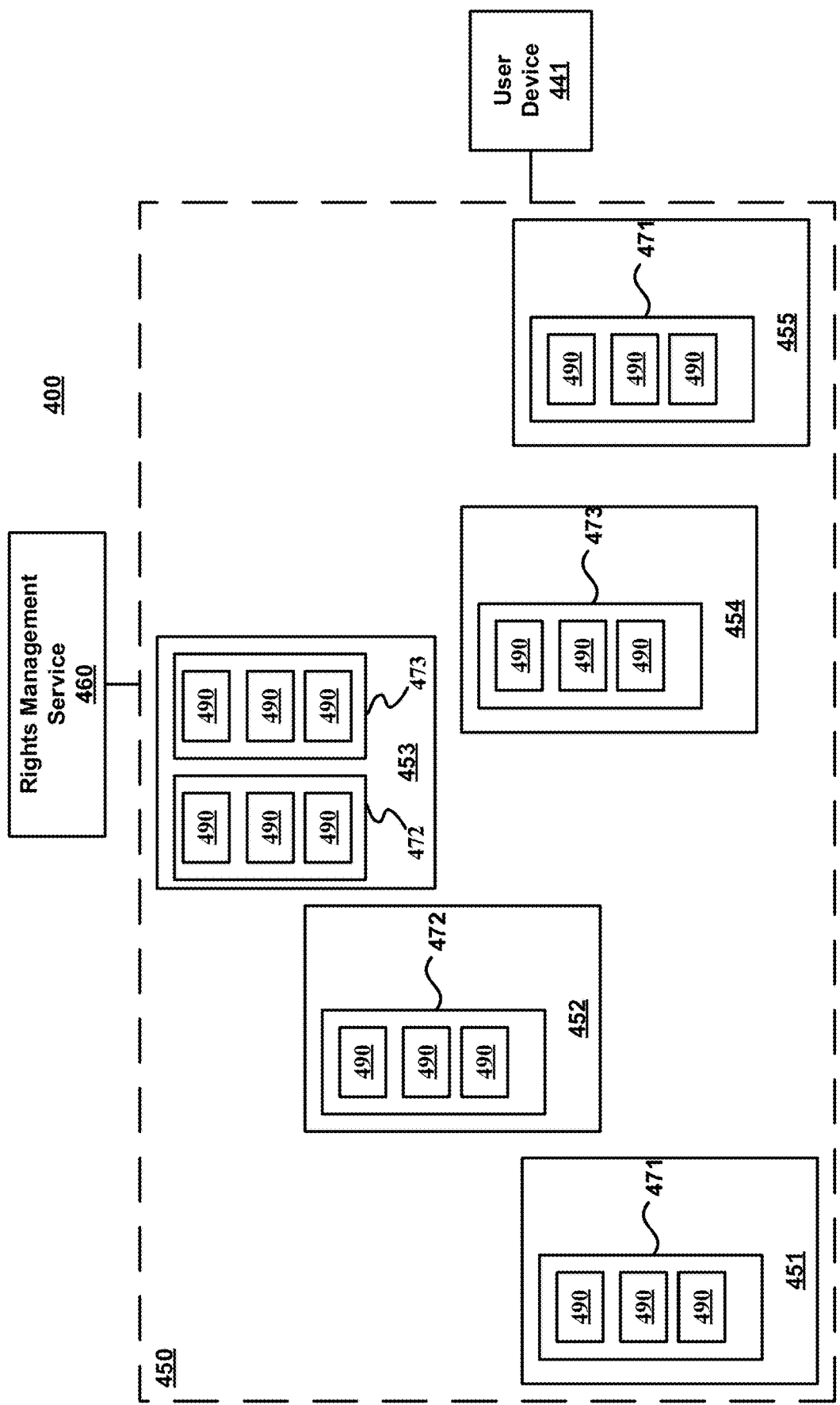
FIG. 4 is a block diagram illustrating an example of the system of FIG. 3.

FIG. 4 is a block diagram illustrating an example of system 400, which may be used as an example of system 300 of FIG. 3. System 400 may include user device 441, rights management service 460, and permissioned blockchain 450. Permissioned blockchain 450 may include nodes 451-455. In some examples, each node 451-455 is a server that includes access level blocks. In the example illustrated, node 451 includes access level block 471, node 452 includes access level block 472, node 453 includes access level block 472 and access level block 473, node 454 includes access level block 473, and node 455 includes access level block 471. In some examples, an access level block is akin to a ledger on a standard blockchain. In some examples, each access level block 470 includes nanoblocks 490.

In some examples, rights management service 460 may initiate the establishment of permissioned blockchain 450 by deploying the permissioned blockchain to a number of nodes that will run the permissioned blockchain, such as nodes 451-455. Permissioned blockchain 450 may be deployed to many more than five nodes, which illustrated by way of a simplified example only. In some examples, permissioned blockchain 450 is used for a medium or large enterprise with a corresponding large number of nodes.

Right management service 460 may then define the access level blocks for permissioned blockchain 450. For instance in some examples, each defined user for permissioned blockchain 450 has a corresponding access level block, each defined clearance level for permissioned blockchain 450 has a corresponding access level block, each defined group (e.g., distribution group, security group, or the like) for permissioned blockchain 450 has a corresponding access level block, each defined object (e.g., a printer) for permissioned blockchain 450 has a corresponding access level block, each defined physical location for permissioned blockchain 450 has a corresponding access level block, each defined trigraph security marking for permissioned blockchain 450 has a corresponding access level block, each defined SAP codeword for permissioned blockchain 450 has a corresponding access level block, and each defined labeling or access control requirement for permissioned blockchain 450 has a corresponding access level block. In some examples, hundreds or thousands of access level blocks may be defined.

For instance, in some examples, top-secret information can be printed only on a top-secret printer that exists on a top-secret network. Accordingly, in some examples, on a top-secret network that includes such a top-secret printer, there would be an access level block for the top-secret clearance level, an access level block for the top-secret network, an access level block for the top-secret printer, and an access level block for each user with top-secret access. In some cases, access may be granted only to a user in a particular physical location. In that case, there would also be an access level block for the particular physical location.

In some examples, each access level blocks is configured to store nanoblocks, where each nanoblock is an encrypted database. Each access level block may store a large number of nanoblocks, such as billions of nanoblocks. A typical blockchain stores one-way cryptographic hashes that are stored on a ledger, and those hashes form a chain. In some examples, permissioned blockchain 450 stores nanoblocks instead of hashes. In some examples, instead of storing hashes, permissioned blockchain 450 stores nanoblocks, which exist as small databases stored in a vertical column, instead of a row, inside the access level block. Each nanoblock may store the immutable details of a cryptographic transaction. In some examples, nanoblocks are relatively small read-only databases and not are metadata, hash tables, or text.

In some examples, information in nanoblocks is encrypted. In a DOD implementation, type one or type two National Security Agency (NSA) encryption is preferably used for the nanoblocks. For non-DOD applications, other forms of encryption may be used for the nanoblocks.

After the access level blocks are defined, in some examples, rights management service 460 uses an algorithm to determine, for each access level block, which nodes in permission blockchain 450 the access level block should be replicated out to.

In permissioned blockchain 450, in some examples, for security reasons, a certain degree of uniqueness of each node is maintained, such that each node does not store the exact same access level blocks as another node, to the extent feasible. In some examples, the amount of uniqueness required and the number of total nodes available are both factors. In some examples, for each access level block, an algorithm is used to determined which nodes the access level block is to be replicated out to. In some examples, each access level block is sent to a separate subset of the nodes than each other access level block to achieve a configurable level of uniqueness for each of the nodes. In some examples, copies of each access level block are kept on at least N different nodes, where N is a configurable integer that is greater than one. In some examples, copies are dispersed to nodes in separate secure datacenters. The algorithm may also take into account server or network health. The algorithm may also take into consideration location, including geographical and distance factors, such as the product code for geographically dispersed environments and network constraints where a copy may have to be regionally located.

In some examples, for each access level block, after the algorithm determines which nodes of permissioned blockchain 450 the access level block is should be replicated out to, the nodes are seeded with the access level blocks, based on the determinations of the algorithm.

In the example illustrated in FIG. 4, there are three access level blocks, 471-473, distributed among five nodes 451-455, with two copies distributed by the algorithm among the five nodes 451-455.

In some examples, after the nodes are seeded with the access level blocks, permissioned blockchain 450 is ready to begin receiving and processing cryptographic operations, including transactions. The transaction may include the verification of the security credentials of a user.

The method in which various transactions may be made vary in various examples. In some examples, transactions such as the verification of security credentials may be initiated by a front-end user interface (UI) which may exist on one or more applications on a user device, such as user device 441. For example, a user may wish to use an application to open a document that is sensitive, confidential, or classified. The application may have a front-end UI installed. When the user attempts to open the document, the application may communicate with permission blockchain to determine, in real time, whether the user has the proper security credentials to view the document.

In some examples, if the front-end UI receives confirmation from permission blockchain 441 that the user has the proper security credentials to view the document, the front-end UI allows the document to be opened by the application. In some examples, if the user does not have the proper security credentials to view the document, then the front-end UI will not allow the document to be opened. In some examples, documents for which the user does not have permission to view are not made visible to the user. Whether the user has the proper security credentials to view a document may, in some examples, depend not just upon the user having a required security level, but may also be contingent upon other factors, such as the location of the user.

The front-end UI of the application may also be used for portion control. An example of portion control is that some portions of a document may not be sensitive, confidential, or classified, while other portions of the document may be sensitive, confidential, or classified. In other examples of portion control, the level of security may vary in different portions of a document; for instance, most of a document may be Secret, with certain portions of the document being Top Secret. The front-end UI may be communicate with permissioned blockchain 450 to determine which portions of the documents the user is allowed to see, and then enforce this by enabling the user to see those portions of the document that the user is allowed to see, and preventing the user from being able to see those portions of the document that the user is not allowed to see.

The front-end UI of the application may also enable making of documents as sensitive, confidential, or classified at a particular level, including entire documents and portion controls. The front-end UI may communicate with permissioned blockchain 450 to determine what type of markings the user is allows to use. The front-end UI may provide the type of marking that the user has access to from a drop-down menu, so that the user may use the drop-down menu to mark documents or portions of a document in ways that the user is allowed to mark a document based on the user's security credentials.

In some examples, the front-end UI may also be installed on an email application. As an example, Project Y and Project Z are top secret projects. A user D, works almost every day at site A on project Z and has data on his One Drive and many Outlook messages about project Z in his inbox. One Drive and Outlook both have the front-end UI installed, and the front-end UI communicates with the permissioned blockchain in real time. D also has access to project Y data but only when he physically works at site B.

Today D was physically located at site B which is across the country from site A. D opens Outlook but only site B and project Y data is presented or available for him to see in his Inbox, Calendar, and associated folders. D's act of logging on at site B, opening Outlook and the filtering of data by permissioned blockchain 450 viewed through the front-end UI client is logged as a nanoblock on the appropriate access level blocks including the user block.

While D is at site B, based on the front-end UI, D can also mark a document or a portion of a document as being top secret and associated with project Y. While D is at site B, D can also email a document marked as top secret and associated with project Y to a recipient with valid security credentials to view the document. When D attempts to send such an email, the front-end UI installed on Outlook checks, in communication with the permissioned blockchain, the security credentials of the recipient(s). If the transaction is validated, the front-end UI allows the email to be sent to the recipient(s). If permission blockchain 450 does not confirm or validate within a period of configurable time, the transaction is disallowed and logged to all appropriate access or document blocks as nanoblocks. In some examples, the retransmission would be allowed up to a configurable number of times.

As discussed above, in some examples, the permissioned blockchain 450 is configured to perform validation for data access. The validation may be based, at least in part, on the security accesses of the user. The validation may also be based on where the data is being access from, which may include facility clearances and what system the data is being accessed from (e.g., network accreditations, subnet, domain).

On permissioned blockchain 450, the currency is the "ticket," that is, the necessary security credentials for accessing particular information. In some examples, a transaction performed on permissioned blockchain 450, such as validating an outgoing email, is very quickly validated by the network of "miners," which are the nodes on permissioned blockchain 450 having the corresponding access level blocks, which check all required access level blocks, including the clearance level, project access, physical or network location of the user, recipient, and any attached data.

In some examples, the miners complete complex mathematical and access validation checks per the blockchain algorithm of permissioned blockchain 450. When the required number of additional miners with copies of the required access level blocks agree and confirm permissions (i.e., proof of ticket). In some examples, the security credentials are stored on the blockchain, and each miner verifies the security credentials in real time. In some examples, when proof of ticket consensus is reached with the required number of miners on permissioned blockchain 450, the transaction is confirmed and recorded on the relevant access level blocks, including the user access level block, as an immutable nanoblock. In some examples, the nanoblocks are quickly created and replicated. Unlike a standard blockchain, in permissioned blockchain 450, in some examples, only nodes on the permissioned blockchain 450 having the corresponding access level block are miners that are allowed to vote to form the consensus that allows a transaction to take place.

Normal document access or creation of an email or document may result in a nanoblock stored within the appropriate access level blocks, including the user access level block and the document access level block.

In some examples, there are multiple copies of each access level block so that there will be a necessary number of miners to reach consensus. In some examples, each copy of the block is kept up to date via secure asynchronous replication based on server high availability and site-resilient software and architecture. Also, in some examples, additional access level blocks will be automatically created to replace a failed node. In some examples, if a node fails, another copy of the access level blocks on that node will be brought online and seeded from an associated access level block.

New access level blocks may be created and deployed after initial deployment, for example, for new users, new projects, and the like. In some examples, the access level block may not become active until replication is completed to the administratively defined minimum number of server nodes that act as miners.

In some examples, the front-end UI may also used to initiate auditing the blockchain, to do a message search, or the like. In some examples, a user must have the proper permissions to do so.

In some examples, nanoblocks cannot be destroyed or deleted except via a special super-administrator role-based access control (RBAC) just-in-time (JIT) account that requires simultaneous authorization from more than one user to access. For example, the RBAC JIT account may have one user who enters half of the password and another user that enters the other half of the password, with no one person knowing the entire password, and the physical fingerprint of both of the users may be required for authentication. In these examples, when the account is accessed, it is active only for a very limited time.

The front-end UI may be used, in communication with permissioned blockchain 450, to control access to information based on classification level, and to provide users with utilities to associate classification labels with the information that they create. The end UI may also enable the establishment of trusted connections with other organizations to allow for the sharing of classified information across organizational boundaries, and assist users with marking recommendations.

The front-end UI may also enable a user to make classification labels, including allowing and validating portion markings, resolving portion markings into overall document classification, automatically setting minimum classification level for document based upon resolved portion markings, applying classification label to document headers and footers, applying programmatic classification label to custom document properties, allowing users to reclassify documents, enabling robust classification label auditing, and applying rights management restrictions to documents based upon the classification label.

The front-end UI for the email application may also enable email protection and validation, including applying portion markings, applying classification labels to email messages, calendar entries, meeting requests, and tasks, automatically setting minimum message classification based upon file attachment classification labels and email portion marking content, validating all e-mail messages prior to transmission to ensure message sender and recipients are authorized for message classification label through permissioned blockchain 450, providing support journaling of all messages processed by the message validation service, and automatically filtering messages from email views based upon current user, location, and network or subnet location.

The front-end UI may also provide secure document management, including applying classification labels to content uploaded to data repositories, displaying classification labels for items displayed in repository views, displaying dynamic color-coded security banners representing classification level of content currently displayed in a data repository, automatically filtering repository views based upon user, location, and network security accesses stored in permissioned blockchain 450, automatically filtering repository search results based upon the user, location, and network security accesses stored in permissioned blockchain 450, and performing intelligent document fingerprinting with a configurable word search to filter, block and audit access attempts.

Although various examples herein have discussed classified environments, various examples may also be used in various commercial industries including finance, big data, health care, and many others, in order to deal with confidential and/or sensitive information.

Illustrative Processes

For clarity, the processes described herein are described in terms of operations performed in particular sequences by particular devices or components of a system. However, it is noted that other processes are not limited to the stated sequences, devices, or components. For example, certain acts may be performed in different sequences, in parallel, omitted, or may be supplemented by additional acts or features, whether or not such sequences, parallelisms, acts, or features are described herein. Likewise, any of the technology described in this disclosure may be incorporated into the described processes or other processes, whether or not that technology is specifically described in conjunction with a process. The disclosed processes may also be performed on or by other devices, components, or systems, whether or not such devices, components, or systems are described herein. These processes may also be embodied in a variety of ways. For example, they may be embodied on an article of manufacture, e.g., as processor-readable instructions stored in a processor-readable storage medium or be performed as a computer-implemented process. As an alternate example, these processes may be encoded as processor-executable instructions and transmitted via a communications medium.

Figure 5:
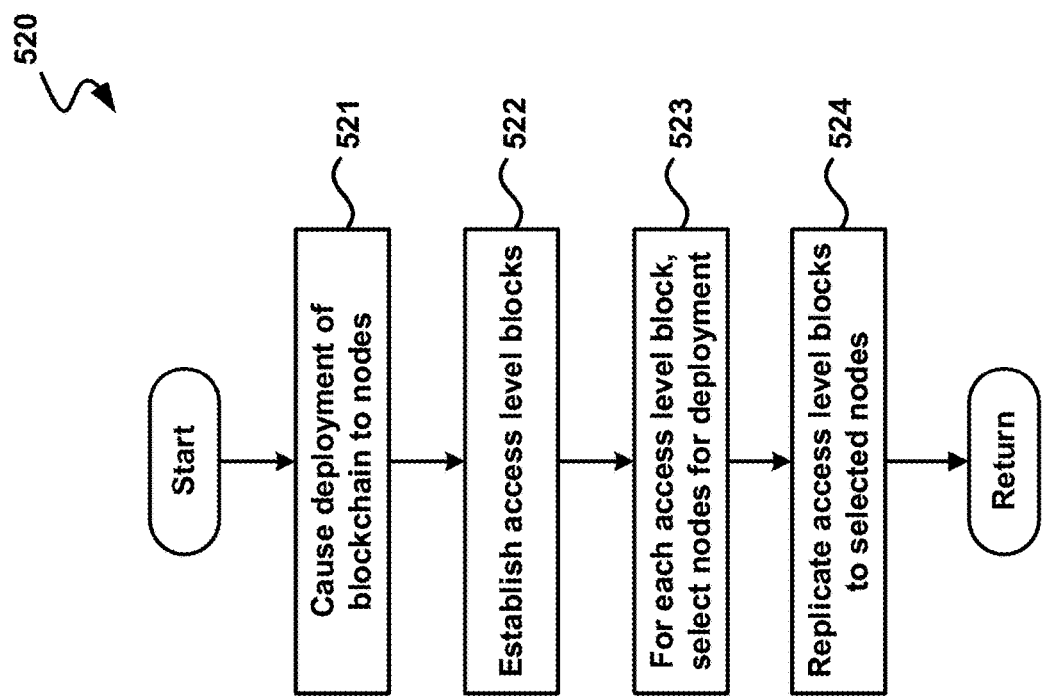
FIG. 5 is a diagram illustrating an example dataflow for a process, in accordance with aspects of the present disclosure.

FIG. 5 is a diagram illustrating an example dataflow for a process (520) for establishing a confidential blockchain network.

In the illustrated example, step 521 occurs first. At step 521, in some examples, a permissioned blockchain is caused to be deployed to a plurality of nodes. As shown, step 522 occurs next in some examples. At step 522, a plurality of access level blocks is established. In some examples, each access level block is configured to store a plurality of nanoblocks, and each nanoblock is an encrypted database. The access level blocks include access levels blocks for users, and the corresponding access level block for each user includes security credentials for the user.

As shown, step 523 occurs next in some examples. At step 523, in some examples, for each access level block of the plurality of access level blocks, nodes are selected among the plurality of nodes for deployment of the access level block.

As shown, step 524 occurs next in some examples. At step 524, in some examples, for each access level block of the plurality of access level blocks, the access level block is replicated to each of the selected nodes, such that, after replicating the access level blocks, there are at least two copies of each access level block on the permissioned blockchain, and the permissioned blockchain is capable of performing cryptographic operations, including determining permissions of the users based at least in part on the security credentials for the users, and is further capable of storing details of the cryptographic operations on the nanoblocks of the access level blocks.

The process may then proceed to a return block, where other processing is resumed.

CONCLUSION

While the above Detailed Description describes certain examples of the technology, and describes the best mode contemplated, no matter how detailed the above appears in text, the technology can be practiced in many ways. Details may vary in implementation, while still being encompassed by the technology described herein. As noted above, particular terminology used when describing certain features or aspects of the technology should not be taken to imply that the terminology is being redefined herein to be restricted to any specific characteristics, features, or aspects with which that terminology is associated. In general, the terms used in the following claims should not be construed to limit the technology to the specific examples disclosed herein, unless the Detailed Description explicitly defines such terms. Accordingly, the actual scope of the technology encompasses not only the disclosed examples, but also all equivalent ways of practicing or implementing the technology.

I claim:

1. An apparatus, comprising:
a device including at least one memory adapted to store run-time data for the device, and at least one processor that is adapted to execute processor-executable code that, in response to execution, enables the device to perform actions, including:
causing a permissioned blockchain to be deployed to a plurality of nodes;
establishing a plurality of access level blocks, wherein each access level block is configured to store a plurality of nanoblocks, wherein each nanoblock is an encrypted database, wherein the access level blocks include access levels blocks for users, and wherein the corresponding access level block for each user includes security credentials for the user; and
for each access level block of the plurality of access level blocks:
selecting nodes among the plurality of nodes for deployment of the access level block; and
replicating the access level block to each of the selected nodes, such that:
after replicating the access level blocks, there are at least two copies of each access level block on the permissioned blockchain, and the permissioned blockchain is capable of performing cryptographic operations, including determining permissions of the users based at least in part on the security credentials for the users, and is further capable of storing details of the cryptographic operations as nanoblocks of the access level blocks; and such that, after the access level block is replicated to each of the selected nodes, the access level block is stored on the selected nodes among the plurality of nodes, and not stored on nodes among the plurality of nodes that are not selected nodes.

2. The apparatus of claim 1, wherein the access level blocks include an access level block for each security clearance level.

3. The apparatus of claim 1, wherein the access level blocks include an access level block for at least one of a defined group, a defined object, a trigraph security marking, a defined codeword, a defined physical location, a defined labeling control requirement, or a defined access control requirement.

4. The apparatus of claim 1, wherein selecting the nodes for each access level block of the plurality of access level blocks includes selecting a separate subset of the plurality of nodes for each access level block such that a configurable level of uniqueness is achieved for each of the nodes of the plurality of nodes.

5. The apparatus of claim 1, wherein selecting the nodes is based on a total cardinality of the nodes, achieving uniqueness among the nodes, the locations of the nodes, server health, and network health.

6. The apparatus of claim 1, wherein replicating the access level block to each of the selected nodes is accomplished such that, after replicating the access level blocks, there are at least N copies of each access level block on the permissioned blockchain, wherein N is a configurable integer greater than one.

7. The apparatus of claim 1, wherein the details of the cryptographic operations stored on the nanoblocks are undeletable except by a role-based administrator account that has just-in-time access that requires simultaneous verification by at least two designated people.

8. A method, comprising:
deploying a blockchain to be deployed to a plurality of servers;
generating a plurality of access level blocks, wherein the access level blocks include access levels blocks for users, and wherein the corresponding access level block for each user includes security credentials for the user; and
replicating the access level blocks to the plurality of servers, such that:
after replicating the access level blocks, there are at least two copies of each access level block on the blockchain, and the blockchain is capable of performing cryptographic operations, including performing proof of ticket consensus based at least in part on the security credentials for the users, and is further capable of storing details of the cryptographic operations as encrypted databases of the access level blocks; and
such that, after the access level block is replicated to the plurality of servers, the access level block is stored on a portion of the plurality of servers, and not stored on another portion of the plurality of servers.

9. The method of claim 8, wherein the access level blocks include an access level block for each security clearance level.

10. The method of claim 8, wherein the access level blocks include an access level block for at least one of a defined group, a defined object, a trigraph security marking, a defined codeword, a defined physical location, a defined labeling control requirement, or a defined access control requirement.

11. The method of claim 8, further comprising, for each access level block, selecting servers among the plurality of servers for deployment of the access level block, wherein replicating the access level blocks to the plurality of servers include replication the access level blocks to the selected servers, and wherein selecting the servers for each access level block of the plurality of access level blocks includes selecting a separate subset of the plurality of servers for each access level block such that a configurable level of uniqueness is achieved for each of the servers of the plurality of servers.

12. The method of claim 8, further comprising, for each access level block, selecting servers among the plurality of servers for deployment of the access level block, wherein replicating the access level blocks to the plurality of servers include replication the access level blocks to the selected servers, and wherein selecting the servers is based on a total cardinality of the servers, achieving uniqueness among the servers, the locations of the servers, server health, and network health.

13. The method of claim 8, wherein replicating the access level blocks to the plurality of servers is accomplished such that, after replicating the access level blocks, there are at least N copies of each access level block on the permissioned blockchain, wherein N is a configurable integer greater than one.

14. The method of claim 8, wherein the details of the cryptographic operations stored on the encrypted databases are undeletable except by a role-based administrator account that has just-in-time access that requires simultaneous verification by at least two designated people.

15. A processor-readable storage medium, having stored thereon processor-executable code that, upon execution by at least one processor, enables actions, comprising:
causing deployment of a permissioned blockchain to a plurality of nodes;
defining a plurality of access level blocks, wherein each access level block is configured to store a plurality of nanoblocks, wherein each nanoblock is an encrypted database, wherein the access level blocks include access levels blocks for users, and wherein the corresponding access level block for each user includes security credentials for the user; and
for each access level block of the plurality of access level blocks:
selecting nodes among the plurality of nodes for deployment of the access level block; and
deploying the access level block to each of the selected nodes, such that:
after deploying the access level blocks, there are at least two copies of each access level block on the permissioned blockchain, and the permissioned blockchain is capable of performing cryptographic operations, including determining permissions of the users based at least in part on the security credentials for the users, and is further capable of storing details of the cryptographic operations as nanoblocks of the access level blocks; and such that, after the access level block is replicated to each of the selected nodes, the access level block is stored on the selected nodes among the plurality of nodes, and not stored on nodes among the plurality of nodes that are not selected nodes.

16. The processor-readable storage medium of claim 15, wherein the access level blocks include an access level block for each security clearance level.

17. The processor-readable storage medium of claim 15, wherein the access level blocks include an access level block for at least one of a defined group, a defined object, a trigraph security marking, a defined codeword, a defined physical location, a defined labeling control requirement, or a defined access control requirement.

18. The processor-readable storage medium of claim 15, wherein selecting the nodes is based on a total cardinality of the nodes, achieving uniqueness among the nodes, the locations of the nodes, server health, and network health.

19. The processor-readable storage medium of claim 15, wherein deploying the access level block to each of the selected nodes is accomplished such that, after deploying the access level blocks, there are at least N copies of each access level block on the permissioned blockchain, wherein N is a configurable integer greater than one.

20. The processor-readable storage medium of claim 15, wherein the details of the cryptographic operations stored on the nanoblocks are undeletable except by a role-based administrator account that has just-in-time access that requires simultaneous verification by at least two designated people.

\* \* \* \* \*